United States Patent
Hundemer

(10) Patent No.: US 9,667,824 B2
(45) Date of Patent: May 30, 2017

(54) USE OF LOCATION LULLS TO FACILITATE IDENTIFYING AND RECORDING VIDEO CAPTURE LOCATION

(71) Applicant: Tribune Broadcasting Company, LLC, Chicago, IL (US)

(72) Inventor: Hank Hundemer, Bellevue, KY (US)

(73) Assignee: Tribune Broadcasting Company, LLC, Chicago, IL (US)

( * ) Notice: Subject to any disclaimer, the term of this patent is extended or adjusted under 35 U.S.C. 154(b) by 231 days.

(21) Appl. No.: 14/288,019

(22) Filed: May 27, 2014

(65) Prior Publication Data
US 2015/0350482 A1    Dec. 3, 2015

(51) Int. Cl.
*H04N 1/21* (2006.01)
*H04N 5/77* (2006.01)
*H04N 9/82* (2006.01)

(52) U.S. Cl.
CPC .............. *H04N 1/2112* (2013.01); *H04N 1/21* (2013.01); *H04N 5/77* (2013.01); *H04N 9/8205* (2013.01)

(58) Field of Classification Search
CPC ........... H04N 21/422; H04N 21/42207; H04N 21/42213; H04N 21/42215;
(Continued)

(56) References Cited

U.S. PATENT DOCUMENTS 6,819,356 B1 * 11/2004 Yumoto ............ G06F 17/30265
                                                    348/231.2
8,558,921 B2    10/2013 Walker et al.
(Continued)

FOREIGN PATENT DOCUMENTS

KR    20050110897    11/2005
KR    20100101960    9/2010

OTHER PUBLICATIONS

International Preliminary Report on Patentability from International Application No. PCT/US2015/031797, dated Nov. 29, 2016.
(Continued)

*Primary Examiner* — Nelson D. Hernández Hernández
(74) *Attorney, Agent, or Firm* — McDonnell Boehnen Hulbert & Berghoff LLP

(57) ABSTRACT

A method and system to facilitate identifying and recording capture location of recorded video. A computing system determines multiple locations where a video camera has been substantially stationary over time, such as by tracking location of the video camera itself or by evaluating where supplemental device carried with the video camera has been substantially stationary over time. The computing system then outputs, for presentation to the videographer or another user, a location-selection prompt that specifies the multiple determined locations as candidate capture-locations for a video that was captured by the video camera. Further, the computing system receives, in response to the location-selection prompt, data that represents a user selection of one of the specified locations. The computing system then records the selected location as capture-location metadata for the video, such as capture-location data integrated with the video or in a database relationship with the video.

20 Claims, 5 Drawing Sheets

(58) Field of Classification Search
CPC ......... H04N 21/42222; H04N 21/4223; H04N 21/4227; H04N 2201/3253
See application file for complete search history.

(56) References Cited

U.S. PATENT DOCUMENTS

| | | |
|---|---|---|
| 2003/0227553 A1 | 12/2003 | Mattis et al. |
| 2011/0109769 A1* | 5/2011 | Bhatt ........................ H04N 5/77 348/231.5 |
| 2011/0113444 A1 | 5/2011 | Popovich |
| 2011/0302130 A1 | 12/2011 | Lee et al. |
| 2014/0172355 A1* | 6/2014 | Kawamoto ............. G01S 19/38 702/150 |

OTHER PUBLICATIONS

International Search Report and Written Opinion from International Application No. PCT/US2015/031797, dated Aug. 20, 2015.

* cited by examiner

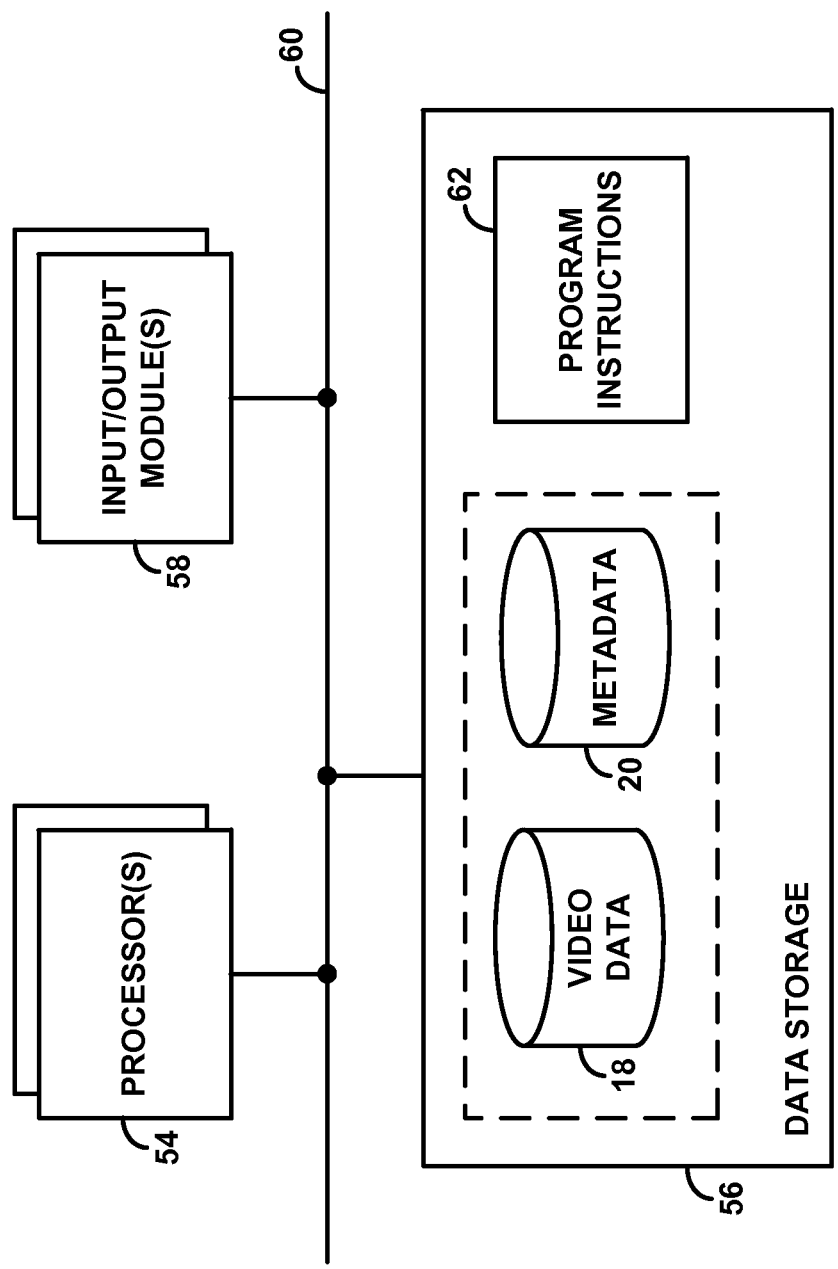

USE OF LOCATION LULLS TO FACILITATE IDENTIFYING AND RECORDING VIDEO CAPTURE LOCATION

REFERENCE TO RELATED APPLICATION

This disclosure is filed on the same date as U.S. patent application Ser. No. 14/288,027, entitled "Use of Wireless Connection Loss to Facilitate Identifying and Recording Video Capture Location," which is assigned to the same assignee as the present disclosure, the entirety of which is hereby incorporated by reference.

BACKGROUND

Unless otherwise indicated herein, the materials described in this section are not prior art to the claims in this disclosure and are not admitted to be prior art by inclusion in this section.

In news production, it is common to have videographers capture video in the field and to transfer that video to a newsroom for use. In practice, the captured video could be transferred as a live video feed to the newsroom, where the video could be broadcast in real-time, edited, and/or stored for later use. Alternatively or additionally, the captured video could be stored and perhaps edited in the field and subsequently transferred to the newsroom for further processing, broadcast, and storage.

As a newsroom accumulates such captured videos, it would be useful for the videos to be indexed in a meaningful manner, to facilitate later searching for desired footage. One way to do this would be to record for each video an indication of location where the video was captured. Provided with such location information, news production personnel could then conveniently search through an archive of video data for video that was captured at a particular location. Unfortunately, however, given the fast-paced nature of typical news production, it may be difficult to reliably record such location information for captured video. Consequently, an improvement is desired.

SUMMARY

Disclosed herein is a method and system to facilitate identifying and recording capture-location of video. The disclosed method and system can be usefully applied in the context of news production as discussed above, but can also apply in other contexts, such as to facilitate managing of personal or family video archives and/or managing of video recordings uploaded to social media systems or cloud storage systems for instance.

In news production, a videographer may move from location to location to capture video for various news stories. In practice, for instance, the videographer may travel in a motor vehicle to various locations, transporting a video camera and associated equipment, along with other news production staff. Once the videographer arrives at each location where the videographer is to capture video, the videographer would then typically exit the vehicle and remove the video camera, and operate the video camera to capture video at that location. Further, as noted above, the captured video could be transferred to a newsroom as a live feed, or the captured video could be stored and later uploaded to the newsroom for use.

As a videographer travels with a video camera between news locations, the videographer and video camera would be in a state of motion, possibly at substantial speeds of the type associated with movement of a motor vehicle or the like, such as over 10 miles per hour, notwithstanding momentary stops for traffic signals or the like. Upon reaching a location where the videographer is to capture video, the videographer and video camera may then slow down or stop moving for period of time as the videographer records video. There, the videographer may operate the video camera on a tripod in a fixed location, in which case the videographer and video camera would be essentially still during the recording process. Alternatively, the videographer may hold the video camera by hand as the videographer walks slowly throughout the news location, perhaps at a walking speed on the order of 3 to 6 miles per hour. At such locations, the videographer and video camera may thus be considered to be substantially stationary, as they are not moving more than a predefined threshold rate of speed at that time, such as not more than 6 miles per hour for example.

The present method and system leverage the fact that a videographer and video camera are often substantially stationary at news locations or at other video capture locations, to help identify and record video capture locations for particular video recordings. In accordance with the disclosure, for instance, when a videographer or other user is reviewing or processing a video captured by the video camera, a computing system may present to the videographer or other user a list of locations where the video camera has been substantially stationary and may then receive in response from the videographer or other user a selection of at least one of the presented locations as a capture location for the video. The computing system may then record that location as capture-location metadata for the video, such as by meta-tagging the video with the capture location and/or by recording the capture location in a database relationship with the video.

More particularly in accordance with the disclosure, a computing system will determine multiple locations where a video camera has been substantially stationary over time, such as by tracking location of the video camera itself or by evaluating where a supplemental device carried with the video camera has been substantially stationary over time. The computing system will then output, for presentation to the videographer or another user, a location-selection prompt that specifies the multiple determined locations as candidate capture-locations for a video that was captured by the video camera. Further, the computing system will receive, in response to the location-selection prompt, data that represents a user selection of one of the specified locations. In turn, the computing system will then record the selected location as capture-location metadata for the captured video.

In practice, the computing system may include at least one processor, at least one data storage, and program instructions stored in the at least one data storage and executable by the at least one processor to carry out these functions. Further, the computing system may take the form of a single computing device, such as a portable computer or a server, that carries out the various indicated functions. Alternatively, the computing device may comprise multiple computing devices that work together to carry out the indicated functions. For instance, the computing system may include a supplemental device that tracks location and identifies locations as "location lulls" where there is less than a predefined threshold extent of movement. Further, the computing system may separately include a remote server, such as a newsroom server, that receives the captured video and a list of the identified location lulls and that presents the location-selection prompt, receives the input representing the user selection of a capture location, and records the selected capture location as metadata for the video. Other arrangements are possible as well.

Thus, in a particular implementation, the disclosed method may involve a computing system receiving video data that represents video captured by a video camera operated by a videographer. Further, the method may involve the computing system receiving, from a supplemental device associated with the videographer, a set of location data that specifies a plurality of location lulls of the supplemental device, where the plurality of location lulls of the supplemental device correspond with location lulls of the video camera operated by the videographer. The method may then involve the computing system determining, based on the location data, locations corresponding with the specified location lulls and outputting a location-selection prompt that specifies the determined locations, to allow user selection of one of the determined locations as a capture location of the received video. In turn, the method may then involve the computing system receiving, in response to the location-selection prompt, data representing user selection of one of the locations specified by the location-selection prompt, and recording the selected location as capture-location metadata for the received video data. In practice, the computing system may be a news-production computing system, including least one processor, such as a newsroom server, or may take other forms.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 5 is a simplified block diagram of an example computing system for implementing the method.

DETAILED DESCRIPTION

Figure 1:
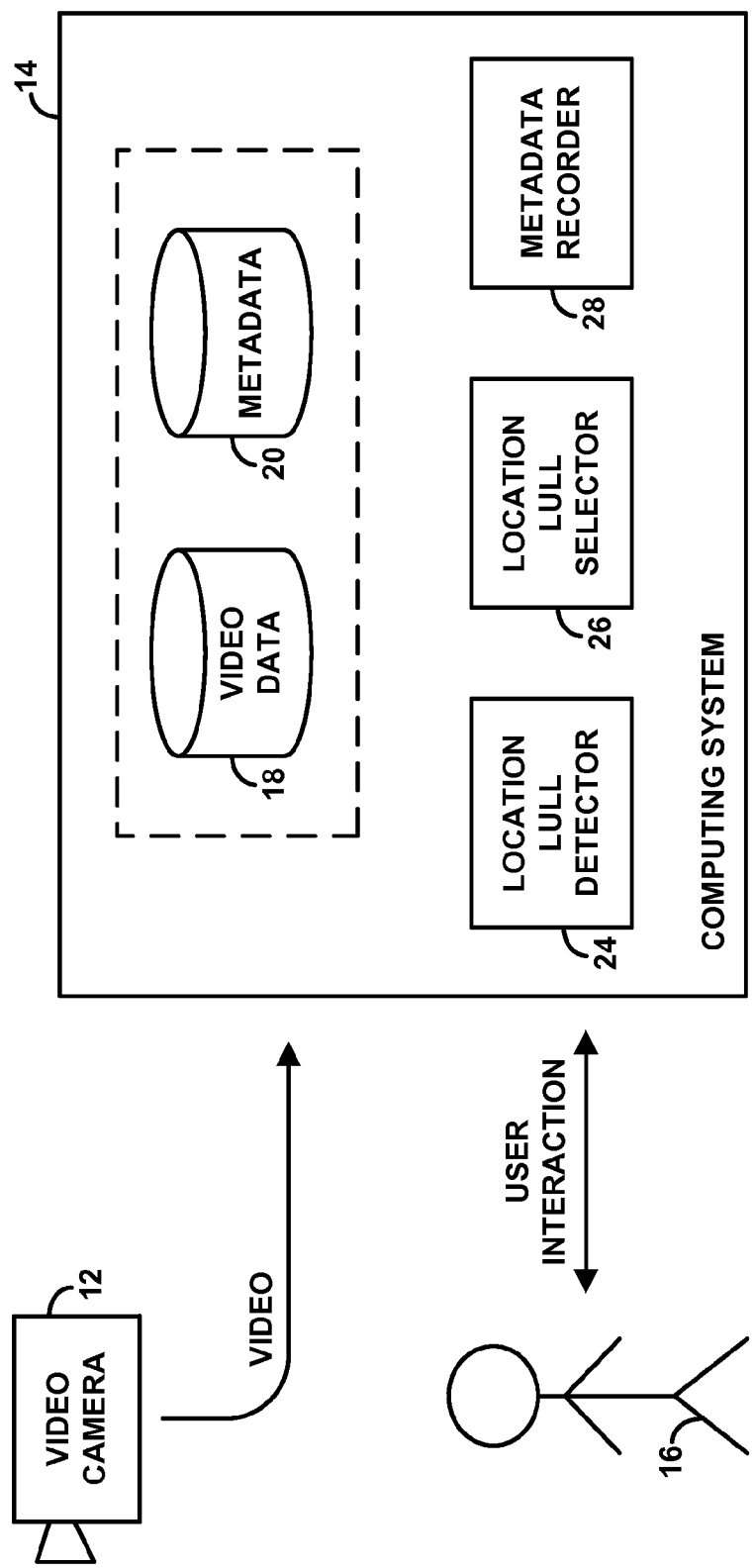
FIG. 1 is a simplified block diagram of an example arrangement for implementing the present method.

Referring to the drawings, as noted above, FIG. 1 is a simplified block diagram depicting an example arrangement for implementing the present method. As shown, the example arrangement includes a video camera 12, a computing system 14, and a user 16. In practice, the user 16 may be a videographer who operates the video camera 12 or may be another individual, such as another news production staff person for instance. The computing system 14 may then comprise one or more computing devices, such as portable computing devices and/or servers. Further, although the computing system 14 is shown separate from the video camera 14, it may also be feasible to incorporate part or all of the computing system with the video camera itself.

In the arrangement shown, the computing system 14 is arranged to receive, or otherwise have access to, video captured by the video camera and to thus hold video data 18 representing the captured video. Further, the computing system is arranged to hold metadata 20 for the video, with the metadata being integrated with the video as header data or the like, or stored separately but in a database relationship with the video.

As illustrated, the computing system is arranged to interact with the user, such as to present the user with a location-prompt that specifies various locations determined to be location lulls of the video camera, and to receive from the user a selection of one of the specified locations as a capture location for a video recorded by the video camera. Further, the computing system is arranged to record the selected location as a capture-location metadata for the video.

As such, FIG. 1 conceptually illustrates the computing system as including a location-lull detector 24, a location-lull selector 26, and a metadata recorder 28, which could be provided as separate or integrated modules by at least one programmed processor or in another arrangement. In this arrangement, the location-lull detector 24 functions to determine location lulls of the video camera, as locations where the video camera has been substantially stationary over time. The location-lull selector 26 then functions to provide a location-selection prompt specifying locations corresponding with the determined location lulls, and to receive input representing user selection of one of the specified locations as a capture location of a video captured by the video camera. Further, the metadata recorder 28 functions to record the selected location as a capture location of the captured video, such as by recording corresponding location data in the video or video file or in a database relationship with the video.

Figure 2:
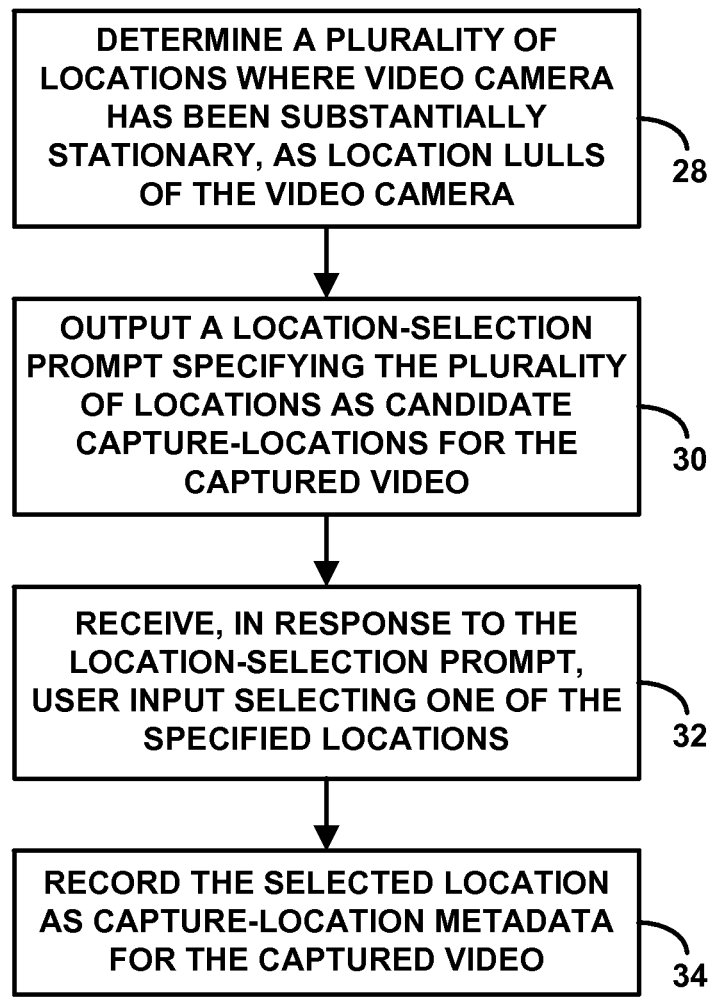
FIG. 2 is a flow chart depicting example functions that can be carried out in accordance with the method.

FIG. 2 is next a flow chart depicting functions that can be carried out by a computing system such as this in accordance with the present method, to identify and record capture location of a video captured by the video camera. In practice, these functions could be carried out after the video camera captures the video, such as upon review of the captured video by the videographer or other user.

As shown in FIG. 2, at step 28, the computing system determines a plurality of locations where the video camera has been substantially stationary, as location lulls of the video camera. At step 30, the computing system then outputs a location-selection prompt specifying the plurality of locations as candidate capture-locations for the captured video. In turn, at step 32, the computing system receives, in response to the location-selection prompt, user input selecting one of the specified locations. At step 34, the computing system then records the selected location as capture-location metadata for the captured video.

In practice, the step of determining the plurality of location lulls of the video camera could take various forms, taking into consideration a number of metrics. By way of example, this step could involve tracking the location of the video camera over time, identifying based on the tracking, instances where the video camera did not move more than a predefined threshold extent per unit time, and determining locations corresponding with those identified instances.

More particularly, the computing system may periodically determine a location of the video camera and may thereby establish and store a sequence of location data points representing location of the video camera over time, including for each location data point a corresponding timestamp indicating date and time that the video camera was at the indicated location. While establishing this sequence of location data points, or after doing so, the computing system may then analyze the sequence in search of subsets of location data points representing location that did not change at more than a predefined threshold rate, and thus representing instances where the video camera was substantially stationary. The computing system may then determine for each such group of location data points a corresponding geographic location, such as a location that is a geometric average of the location data points, and deem each such location to be one of the location lulls. For each such location lull, the computing system may thus record in data storage an indication of a corresponding location and timestamp.

For this purpose, the computing system could periodically determine the location of the video camera by determining the location of a supplemental device expected to be near the video camera, such as a cell phone or other such device registered to and thus likely to be carried by a videographer who operates the video camera. In this way, the location of the supplemental device would serve as a proxy or representation of the location of the video camera, given that the supplemental device is likely to be co-located with the video camera, even though at times the supplemental device may not be actually co-located with the video camera. Alternatively, the computing system could more directly track the location of the video camera itself.

Further, the location data points established as a representation of location of the video camera over time could take various forms and be determined in various ways, and could be evaluated in various ways to identify location lulls. By way of example, the location data points could be geographic location coordinates, such as latitude and longitude coordinates for instance, determined by use of a satellite-based positioning system, such as the Global Positioning System (GPS). For instance, a supplemental device such as a cell phone carried by the videographer could include a GPS module and could be arranged to periodically determine and record its geographic location coordinates as location data points. The cell phone or another computing device could then evaluate those geographic locations to identify as location lulls locations where the geographic location did not change more than a predefined threshold extent per unit time.

As another example, the location data points could be locations designated within, or determined by coverage of, a cellular wireless communication network. For instance, the videographer's cell phone could be arranged to periodically determine and record as location data points the base station coverage areas in which the cell phone is located and perhaps round trip signal delays indicating distance of the cell phone from those base stations. The cell phone or another computing device may then evaluate that data to identify as location lulls locations where the cellular coverage did not change more than a threshold extent per unit time, optimally determining and recording geographic location coordinates corresponding with each such location.

To identify instances where the location did not change more than a threshold extent per unit time, the computing system may comb through the sequence of location data points, comparing sequential points and sequential groups of points, to determine whether the location indicated by those points did not change more than a predefined threshold extent. If the points are recorded periodically, such a determination could then be deemed a determination that the location as indicated by the group of points did not change more than a threshold extent per unit time, and thus that there was an absence of movement more than a predefined threshold extent per unit time. Through this process, the computing system could deem the video camera to have been substantially stationary in response to the computing system determining that location of the video camera did not change at more than a predefined threshold rate for at least a designated period of time, such for at least five or ten minutes, reasonably indicating that the video camera was likely substantially stationary for more than just a moment. As such, the computing system could disregard instances where the video camera was just briefly stationary, as may occur when a motor vehicle transporting the video camera stops in traffic or at traffic lights for instance.

Furthermore, in determining whether the video camera was moving more than a threshold extent per unit time, the computing system could consider metrics from one or more other sensors as well. Such sensors could similarly be integrated with the video camera or provided in a supplemental device such as a cell phone carried by the videographer for instance.

By way of example, an accelerometer could provide measures of acceleration and deceleration over time, and the computing system could deem those measures to indicate movement associated with being in a motor vehicle or rather to indicate lack of such movement and perhaps being substantially stationary. As another example, a battery temperature sensor could provide measures of battery temperature over time, and the computing system could deem sufficient change in such temperature to indicate substantial movement, as may result from moving between indoors and outdoors or the like, and could deem the absence of such change to indicate lack of such movement and perhaps being substantially stationary. Further, as still another example, a pressure sensor could provide measures of pressure over time, and the computing system could deem a sufficient change in pressure to indicate substantial movement, as may result from moving between areas of different levels of pressure, and could deem the absence of such change to indicate lack of movement and perhaps being substantially stationary. Other examples are possible as well.

In line with the discussion above, once the computing system has determined locations representing location lulls of the video camera, the computing system may present the videographer or another user with a prompt that specifies those locations as candidate capture-locations and may receive from the user a selection of one of the specified locations to be recorded as capture-location metadata for a video captured by the camera. In practice, for instance, this could occur when the videographer or another user is reviewing video footage captured by the camera, such as in the field or at a newsroom. At that time, the user could enter into the computing system a relevant time range, or the computing system could automatically select a relevant time range, such as the past day or week for instance, and the computing system may then present the user with a prompt specifying locations representing determined location lulls of the video camera in that time period.

In practice, the computing system may interact with the user through a graphical user interface, such as through a Hypertext Markup Language (HTML) interface for instance. Through that interface, the computing system may output a representation of the video captured by the video camera and may allow a user to view and select all or a portion of the video as the video recording at issue. For instance, the interface may incorporate a media player that plays the captured video and may include controls selectable by the user to cause the computing system to play designated portions of the video and to receive user input demarcating start and end points defining the video recording at issue. Further, through the interface, the computing system may prompt the user to designate a relevant time period for consideration of location lulls, such as by presenting a calendar and/or clock object through which the user can designate beginning and end times for the time period at issue. The computing system may then present on the interface the prompt specifying the locations representing determined location lulls of the video camera in that time period and may receive the user selection of one of the specified locations.

Optimally, the location prompt will specify the locations in a manner that is readily understandable by the user, rather than as geographic location coordinates. Thus, if the computing system has stored the set of locations as latitude/longitude coordinates, the computing system may refer to mapping data to programmatically translate those location coordinates into a more user-understandable form. By way of example, the computing system could translate the location coordinates into a graphical map of a region with pin-markers, balloons, or other graphical objects illustrating the various determined locations on the map, and the computing system may present the resulting map graphic as a graphical user interface and receive input representing user clicking or other selection of one of the illustrated locations. Further, as another example, the computing system could translate the location coordinates to city and street addresses, names of points of interest, or other user-understandable form and could present a drop-down list from which the user could then readily select one of the specified locations.

Once the computing system thus receives from the user a selection of one of the specified locations, the computing system may then record the selected location as capture-location metadata for the video recording at issue. As noted above, the computing system may do this in various ways. By way of example, the computing system may record the selected location as capture-location metadata within a file representing the video itself, or separately but in a database relationship with the video. For instance, the computing system may store a data file representing the video recording at issue and may write to a header or other portion of that data file a specification of the selected location as a capture location of the video. Alternatively or additionally, the computing system may store a data file representing the video recording at issue and may write to a database a relationship between that data file and the capture location. In either case, recording the capture location of the video may then allow subsequent searching for the video based on the recorded capture location.

As noted above, the computing system that carries out these functions could be provided as a single computing device or distributed among multiple devices. Further, part or all of the computing system could be co-located with the video camera and videographer or could be provided remotely, possibly accessible over a web interface or the like.

In one example implementation, for instance, the computing system could be provided fully in the form of one or more computing devices local to the videographer and the video camera. For instance, the videographer may have a cell phone that the videographer keeps in his or her pocket and perhaps a portable computer (e.g., computer server) such as a notebook computer or tablet computer that the videographer brings with to news locations, and the cell phone and portable computer may be programmed to run one or more applications that cause them to carry out functions described herein. Further, the cell phone, portable computer, and video camera may be configured to communicate with each other through wired and/or wireless links in accordance with any agreed protocol.

In that arrangement, the videographer's cell phone may track its own location over time as representative of location of the video camera over time and may determine the location lulls as discussed above and perhaps transmit to the portable computer specifications of the determined location lulls, possibly taking into account various sensor metrics as discussed above. Alternatively, the cell phone may track its location over time and transmit raw location data points to the portable computer, and the portable computer may determine the location lulls as discussed above.

Further, the videographer's cell phone and/or portable computer may receive from the video camera video data representing a video captured by the video camera. For instance, through communication with the video camera, the cell phone and/or portable computer may receive a data file representing the captured video or may receive a real-time video stream. The cell phone and/or portable computer may then present the video to a user via a display screen, receive user selection of all or a portion of the video, and record in data storage the selected video as the captured video at issue.

Still further, the cell phone and/or portable computer may receive from the user a designation of a relevant time period and may present to the user a location-selection prompt specifying the locations representing location lulls determined for that time period and receive from the user a selection of one of the specified locations as capture location for the video at issue. In turn, the cell phone and/or portable computer may then record the selected location as capture-location metadata for the video, and/or may transmit to another computing device data that correlates the capture location with the video.

Figure 3:
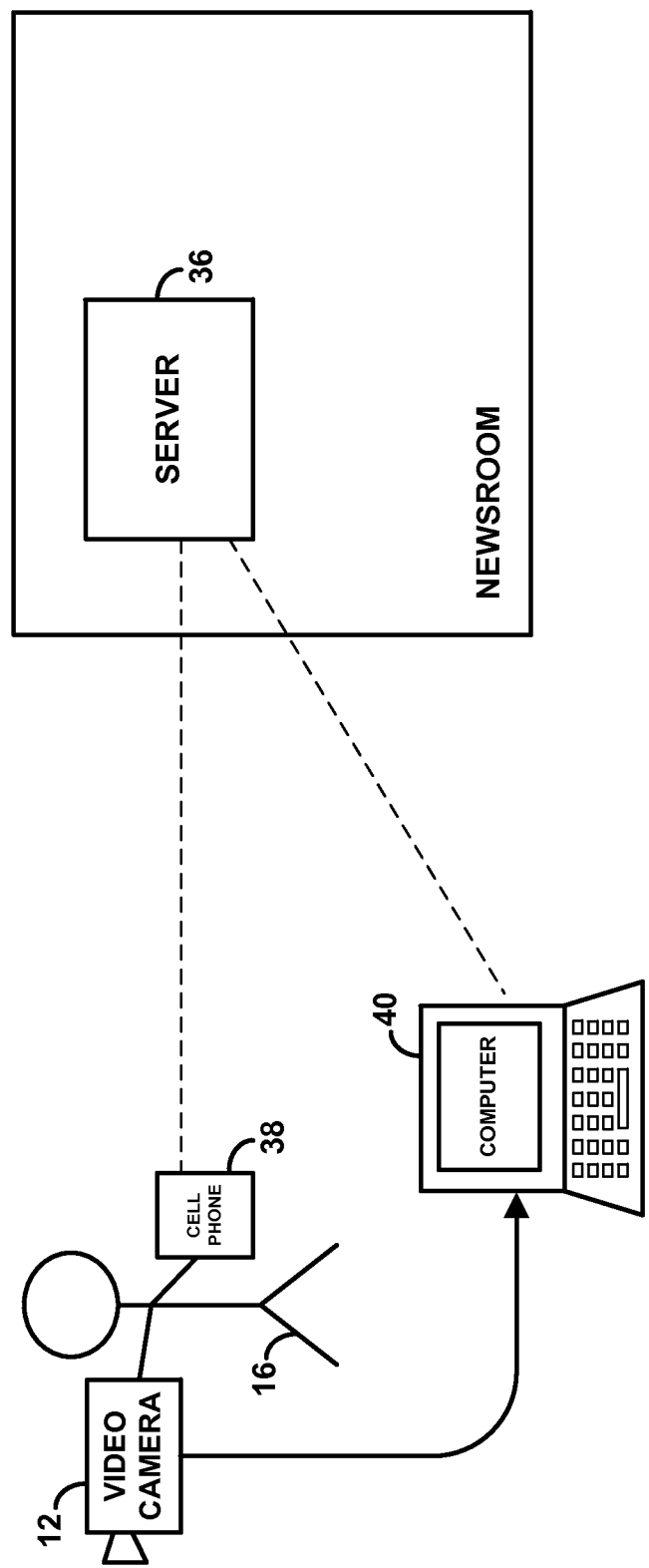
FIG. 3 is a simplified block diagram of another example arrangement for implementing the method.

In another example implementation, illustrated by FIG. 3, the computing system could include a remote server 36, such as a newsroom server, and a supplemental device such as a cell phone 38 or other device carried by the videographer, and a portable computer 40 that the videographer uses in the field to interact with the remote server.

In that arrangement, the cell phone may track its location over time and may evaluate the location data and identify location lulls representing location lulls of the video camera. At some point after the videographer uses the video camera to capture video, the videographer may then use the portable computer to log into the remote server and, through a web interface or other interface provided by the remote server, to upload the resulting video data to the remote server. Further, the remote server may obtain from the cell phone the determined location lulls and carry out other functions described herein, including providing the location-prompt, receiving user selection of a capture location, and recording the selected location as capture-metadata for a designated video recorded by the video camera.

In this scenario, when the videographer (as operator of the video camera) logs into the remote server, the remote server may determine an identity of the videographer based on that login, such as based on a username provided by the videographer, and the remote server may then programmatically correlate that videographer identity with an identity of the videographer's cell phone, such as a phone number or other address at which the server can remotely access the cell phone.

The remote server may then establish or make use of established communication with that particular cell phone and request and receive from the cell phone a report of the determined location lulls. For instance, the remote server may communicate with the cell phone through an existing data session that the server has with the cell phone, or the remote server may communicate with the cell phone in other ways, such as by Short Message Service messaging (e.g., Wireless Application Protocol push messaging), and may programmatically transmit to the cell phone a request for the location data representing the determined location lulls and receive from the cell phone, in response to the request, the location data. Through this process, the cell phone may be considered the device that determines the location lulls. Alternatively, the remote server may be considered the device that determines the location lulls, by receiving the location-data that specifies the location lulls and reading that received data.

Further, through the web interface or other interface that the remote server has with the videographer, the remote server may output for presentation to the videographer the uploaded video and receive from the videographer a selection of all or part of the video as the video at issue and of a relevant time period.

In addition, through the interface, the remote server may output for presentation to the videographer a location-selection prompt specifying locations representing the video camera location lulls determined for that time period, and receive from the videographer a selection of at least one of the specified locations as a capture location of the video at issue. In practice, this output of the location-selection prompt could be output of an HTML page or the like that defines the prompt, and the videographer's portable computer may render that page for presentation to the videographer. Through interaction with that rendered page, the videographer may then select one of the specified locations, and the portable computer may responsively transmit to the remote server, in an HTTP POST message for instance, data that represents the user selected capture location.

In turn, the remote server may then record the selected location as capture-location metadata for the video at issue. In particular, the remote server may record the selected location as capture-location metadata in a video file representing the video at issue, and/or the remote server may record the selected location as capture-location metadata in a database relationship with such a video file.

Figure 4:
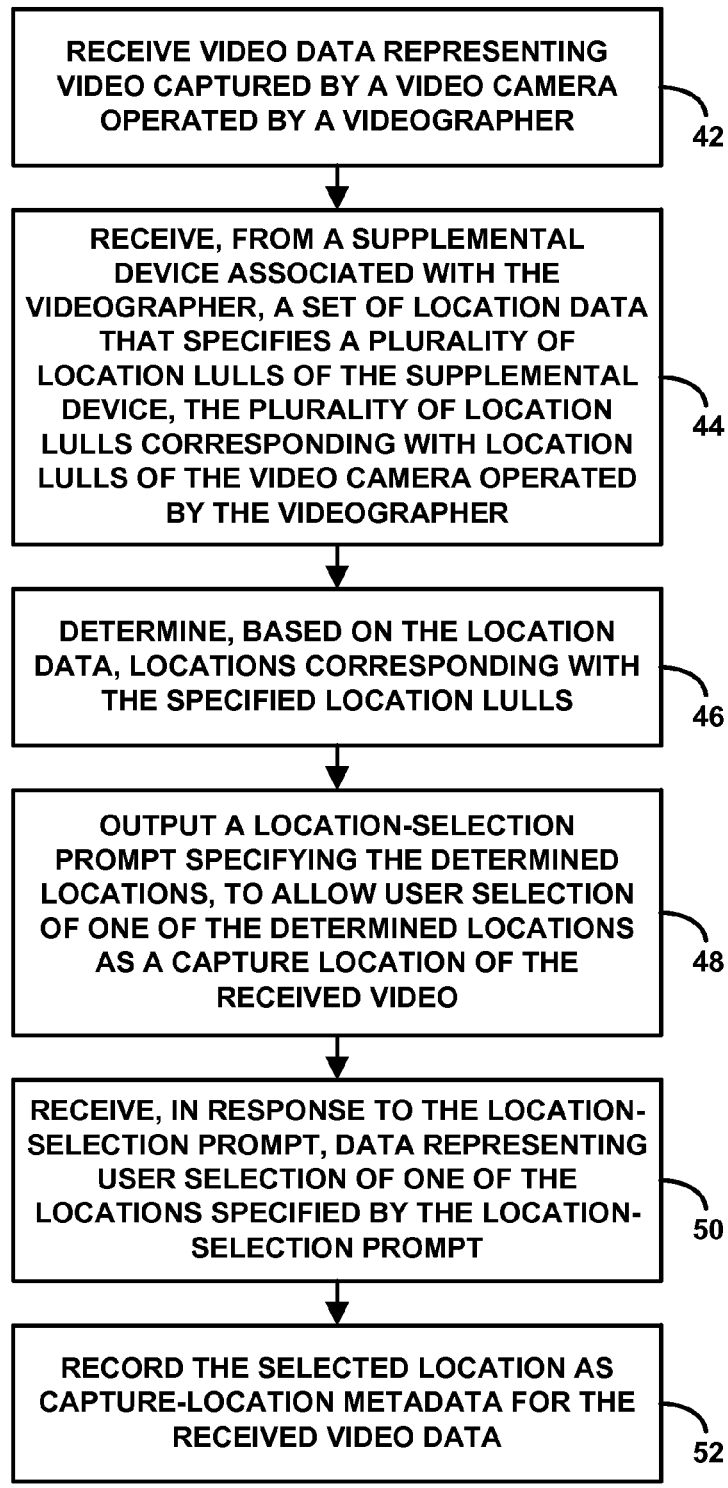
FIG. 4 is another flow chart depicting example functions that can be carried out in accordance with the method.

FIG. 4 is next another flow chart depicting functions that can be carried out in accordance with the present method, to identify and record capture location of a video captured by the video camera. Although various steps are shown in a particular order in this figure, it will be understood that variations are possible. For instance, certain steps could be carried out in different order or in parallel with other steps.

As shown in FIG. 4, at step 42, a computing system receives video data representing video captured by a video camera operated by a videographer. Further, at step 44, the computing system receives, from a supplemental device associated with the videographer, such as a cell phone or other device registered to and thus likely to be carried by the videographer, a set of location data that specifies a plurality of location lulls of the supplemental device, the plurality of location lulls of the supplemental device corresponding with location lulls of the video camera operated by the videographer.

In line with the discussion above, for instance, the computing system may receive the video data through a first communication session with the videographer, such as through a communication session with a portable computer operated by the videographer. Further, responsive to that first communication session being with the videographer, the computing system may determine which supplemental device is associated with the videographer and may establish a second communication session with the determined supplemental device and receive the location data from the supplemental device through that established second communication session.

At step 46, the computing system determines, based on the location data, locations corresponding with the specified location lulls. At step 48, the computing system then outputs a location-selection prompt specifying the determined locations, to allow user selection of one of the determined locations as a capture location of the received video. Further, at step 50, the computing system receives, in response to the location-selection prompt, data representing user selection of one of the locations specified by the location-selection prompt.

For instance, again in line with the discussion above, the computing system may output the location-selection prompt in the first communication session with the videographer. Further, the computing system may then receive in the first communication session the data representing the user selection of one of the locations specified by the location-selection prompt.

At step 52, the computing system then records the selected location as capture-location metadata for the received video data, such as by recording the selected location as capture-location metadata in the video data and/or by recording the selected location as capture-location metadata separate from the video data but in a database relationship with the video data.

Finally, FIG. 5 is a simplified block diagram depicting components of an example computing system operable to carry out the present method. As shown in the figure, the example computing system includes one or more processors 54, one or more data storage units 56, and one or more input/output modules 58, all of which may be communicatively linked together by a system bus, network, and/or other connection mechanism 60.

Processor(s) 54 may comprise one or more general purpose processors (e.g., microprocessors) and/or one or more special purpose processors (e.g., application specific integrated circuits). Data storage unit(s) 56 may then comprise one or more volatile and/or non-volatile storage units, such as magnetic, optical, or flash storage, and may be integrated in whole or in part with processor(s) 54. Further, input/output module(s) 58 may comprise one or more user interface modules for providing output to a user and receiving input from a user, and/or one or more communication interface modules such as wireless or wired network communication interfaces to facilitate communication with one or more other devices as described above.

As shown, data storage unit(s) 56 hold video data 18 and metadata 20 as discussed above. Further, data storage unit(s) hold program instructions 62, which are executable by processor(s) 54 to carry out various functions described herein. For instance, the program instructions may be executable by the processor(s) to (i) determine a plurality of locations where a video camera has been substantially stationary, (ii) output a location-selection prompt specifying the determined plurality of locations as candidate capture-locations for a video captured by the video camera, (iii) receive, in response to the location-selection prompt, data that represents a user selection of one of the specified locations, and (iv) record the selected location as capture-location metadata for the captured video.

Exemplary embodiments have been described above. Those skilled in the art will understand, however, that changes and modifications may be made to these embodiments without departing from the true scope and spirit of the invention.

What is claimed is:

1. A method comprising:
   determining by a computing system a plurality of locations where a video camera has been substantially stationary, wherein the computing system comprises at least one processor;
   outputting by the computing system a location-selection prompt specifying the determined plurality of locations as candidate capture-locations for a video captured by the video camera;
   receiving by the computing system, in response to the location-selection prompt, data that represents a user selection of one of the specified locations; and
   recording by the computing system the selected location as capture-location metadata for the captured video.

2. The method of claim 1, where determining the plurality of locations where the video camera has been substantially stationary comprises determining the plurality of locations as locations where a supplemental device associated with an operator of the video camera has been substantially stationary.

3. The method of claim 2, wherein the computing system comprises the supplemental device, wherein determining the plurality of locations comprises the supplemental device determining the plurality of locations.

4. The method of claim 3, wherein the computing system further comprises a server, the method further comprising:
   receiving, by the server, video data representing the video captured by the video camera; and
   receiving, by the server, from the supplemental device, location data representing the plurality of determined locations where the video camera has been substantially stationary,
   wherein outputting by the computing system the location-selection prompt comprises the server outputting the location-selection prompt, wherein receiving by the computing system the data that represents the user selection of one of the specified capture locations comprises the server receiving the data that represents the user selection of one of the specified capture locations, and wherein recording by the computing system the selected capture location as metadata for the captured video comprises the server recording by the computing system the selected capture location as metadata for the captured video.

5. The method of claim 4, further comprising:
   identifying by the server the supplemental device, based on an identity of the operator of the video camera,
   wherein receiving by the server the location data representing the plurality of determined locations where the video camera has been substantially stationary comprises (i) transmitting from the server to the identified supplemental device a request for the location data and (ii) receiving by the server from the identified supplemental device, in response to the request, the location data.

6. The method of claim 1, wherein determining the plurality of locations where the video camera has been substantially stationary comprises:
   evaluating a series of location data points representing geographic location of the video camera over time;
   based on the evaluating, detecting instances of the video camera not moving more than a threshold extent per unit time; and
   determining, as the plurality of locations, geographic locations corresponding with the detected instances.

7. The method of claim 6, further comprising:
   generating, by the computing system, the series of location data points by determining and recording the geographic location of the video camera over time.

8. The method of claim 7, wherein determining the geographic location of the video camera over time comprises determining, as the geographic location of the video camera, geographic location of a supplemental device associated with an operator of the video camera.

9. The method of claim 1, wherein determining the plurality of locations where the video camera has been substantially stationary comprises:
   receiving location-data specifying the plurality of locations where the video camera has been substantially stationary; and
   reading the plurality of locations from the received location-data.

10. The method of claim 1, further comprising receiving into the computing system video data representing the video captured by the video camera, wherein recording by the computing system the selected location as capture-location metadata for the captured video comprises a function selected from the group consisting of (i) recording the selected location as capture-location metadata in the video data and (ii) recording the selected location as capture-location metadata separate from the video data but in a database relationship with the video data.

11. A method comprising:
   receiving, into a computing system, video data representing video captured by a video camera operated by a videographer, wherein the computing system comprises at least one processor;
   receiving, into the computing system, from a supplemental device associated with the videographer, a set of location data that specifies a plurality of location lulls of the supplemental device, wherein the plurality of location lulls of the supplemental device correspond with location lulls of the video camera operated by the videographer;
   determining, by the computing system, based on the location data, locations corresponding with the specified location lulls;
   outputting, by the computing system, a location-selection prompt specifying the determined locations, to allow user selection of one of the determined locations as a capture location of the captured video;
   receiving, by the computing system, in response to the location-selection prompt, data representing user selection of one of the locations specified by the location-selection prompt; and
   recording, by the computing system, the selected location as capture-location metadata for the received video data.

12. The method of claim 11, wherein receiving the video data comprises receiving the video data through a first communication session with the videographer, and wherein receiving the location data from the supplemental device associated the videographer comprises:
   responsive to the first communication session being with the videographer, (i) determining which supplemental device is associated with the videographer, and (ii) establishing a second communication session with the determined supplemental device; and
   receiving the location data from the supplemental device through the established second communication session.

13. The method of claim 12,
wherein outputting the location-selection prompt comprises outputting the location-selection prompt in the first communication session, and
wherein receiving the data representing the user selection of one of the locations specified by the location-selection prompt comprises receiving in the first communication session the data representing the user selection of one of the locations specified by the location-selection prompt.

14. The method of claim 12, wherein the supplemental device is a cell phone.

15. The method of claim 12, wherein each location lull defines absence of movement more than a predefined threshold extent per unit time.

16. The method of claim 11, wherein recording, by the computing system, the selected location as capture-location metadata for the received video data comprises a function selected from the group consisting of (i) recording the selected location as capture-location metadata in the video data and (ii) recording the selected location as capture-location metadata separate from the video data but in a database relationship with the video data.

17. A computing system comprising:
at least one processor;
at least one data storage; and
program instructions stored in the at least one data storage and executable by the at least one processor to carry out functions comprising:
determining a plurality of locations where a video camera has been substantially stationary,
outputting a location-selection prompt specifying the determined plurality of locations as candidate capture-locations for a video captured by the video camera,
receiving, in response to the location-selection prompt, data that represents a user selection of one of the specified locations, and
recording the selected location as capture-location metadata for the captured video.

18. The computing system of claim 17, wherein the computing system comprises a supplemental device separate from the video camera, wherein determining the plurality of locations where the video camera has been substantially stationary comprises (i) tracking location of the supplemental device over time, and (ii) determining, as the plurality of locations where the video camera has been substantially stationary, locations where the supplemental device has been substantially stationary.

19. The computing system of claim 18, wherein the supplemental device comprises a cell phone associated with a videographer who operates the video camera, and wherein the computing system further comprises a newsroom server separate from the video camera and separate from the supplemental device,
wherein the newsroom server determines an identity of the cell phone based on an identity of the videographer,
wherein the newsroom server establishes communication with the identified cell phone and receives, through the communication, location data representing the determined plurality of locations,
wherein the newsroom server receives video data representing the captured video, and
wherein the newsroom server provides the location-selection prompt, receives the data representing the user selection of one of the specified locations, and records the selected location as the capture-location metadata for the video.

20. The computing system of claim 17, wherein recording the selected location as the capture-location metadata for the received video data comprises a function selected from the group consisting of (i) recording the selected location as capture-location metadata in the video data and (ii) recording the selected location as capture-location metadata separate from the video data but in a database relationship with the video data.

* * * * *